United States Patent
Shvodian (10) Patent No.: US 12,513,555 B2
(45) Date of Patent: Dec. 30, 2025

(54) CONGESTION BASED SCHEDULING BASED ON DEVICE CAPABILITIES

(71) Applicant: T-MOBILE INNOVATIONS LLC, Overland Park, KS (US)

(72) Inventor: William Martin Shvodian, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 299 days.

(21) Appl. No.: 18/369,020

(22) Filed: Sep. 15, 2023

(65) Prior Publication Data

US 2025/0097757 A1    Mar. 20, 2025

(51) Int. Cl.
*H04W 28/02*    (2009.01)
*H04W 72/56*    (2023.01)

(52) U.S. Cl.
CPC ... *H04W 28/0215* (2013.01); *H04W 28/0284* (2013.01); *H04W 72/56* (2023.01)

(58) Field of Classification Search
CPC ......... H04W 28/0215; H04W 28/0284; H04W 72/56; H04W 28/0289; H04W 72/51; H04W 72/52
See application file for complete search history.

(56) References Cited

U.S. PATENT DOCUMENTS

| | | | |
|---|---|---|---|
| 2015/0092573 A1* | 4/2015 | Zhang | H04W 72/56 370/252 |
| 2016/0212757 A1* | 7/2016 | Jung | H04W 72/51 |
| 2020/0053718 A1* | 2/2020 | Huang | H04W 72/51 |
| 2023/0254924 A1 | 8/2023 | Jones | |

OTHER PUBLICATIONS

Extended European Search Report received for European Application No. 24200457.0, mailed on Jan. 27, 2025, 6 pages.

* cited by examiner

*Primary Examiner* — Khoa Huynh
(74) *Attorney, Agent, or Firm* — Shook Hardy & Bacon L.L.P.

(57) ABSTRACT

Methods and systems for providing congestion-based scheduling in a network, based on device capabilities are provided. A method begins with receiving, from a first user device, a device capability message, wherein the device capability message comprises a number of receive antennas of the first user device for each supported frequency band. Next, a determination that the number of receive antennas of the first user device is not equal to the number of receive antennas required by the network operator for the assigned frequency band. Based on the determining, the method continues with prioritizing at least one downlink transmission to at least one second user device. The at least one second user device comprises the number of receive antennas required by the network operator for the assigned frequency band. The prioritization information is then transmitted to the first user device and the at least one second user device.

20 Claims, 4 Drawing Sheets

CONGESTION BASED SCHEDULING BASED ON DEVICE CAPABILITIES

BACKGROUND

In certain mid-range frequency bands devices using the network are required to have four receive antennas, resulting in four radio frequency (RF) chains. In lower frequency bands only two receive antennas are required. The four receive antennas allow for up to four layer multiple-input multiple-output (MIMO) downlink transmissions. The four receive antennas also offer better signal to noise and interference ratios (SINR) than two receive antennas. In addition, the four receive antennas offer improved reference sensitivity. While four receive antennas offer advantages, it is not always feasible to incorporate four receive antennas in small devices such as wearables, or other similarly small form factor devices with network connectivity capability so relaxing the requirement from four receive antennas to two receive antennas for such devices is being considered. Using only two receive antennas in a frequency band where four antennas are currently stipulated by the relevant standards will negatively affect network capacity and spectral efficiency. Today network operators can refuse to allow a UE with only two receive antennas from using a band where the network operator requires four receive antennas, but the network operators do not have mechanisms to allow two receive antenna devices to access frequency bands that are limited to devices with four receive antennas, while minimizing the impact of such devices on the network performance.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for providing congestion-based scheduling in a network, based on device capabilities are provided. A method for congestion-based scheduling in a network based on device capabilities begins with receiving, from a first user device, a device capability message. The device capability message comprises a number of receive antennas of the first user device for each supported frequency band. Next, a determination that the number of receive antennas of the first user device is not the number of receive antennas required by the network operator for the assigned frequency band. As an example, the first user device may have two receive antennas while for the assigned frequency band the network operator requires four receive antennas. Then, based on the determining, the method continues with prioritizing at least one downlink transmission to at least one second user device. The at least one second user device comprises the number of receive antennas required by the network operator for the assigned frequency band. The prioritization information is then transmitted to the first user device and the at least one second user device.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure.

Further, various technical terms are used throughout this description. An illustrative resource that fleshes out various aspects of these terms can be found in Newton's Telecom Dictionary, $32^{nd}$ Edition (2022).

Wireless networks may use multiple frequency bands to provide communication services. In certain mid-range frequency bands user equipment (UE) are required to have four receive antennas, resulting in four receive RF chains. The four receive antenna requirement is mandated by the applicable wireless network standards to ensure sufficient capacity for large numbers of network users. In lower frequency bands devices are required to have only two receive antennas. The four receive antennas allow four layer MIMO operation. The four receive antennas provide better SINR than two receive antennas and also offer improved reference sensitivity. However, in many devices, it is not feasible to incorporate four receive antennas and this is particularly true for wearable devices such as smart watches, smart glasses and similarly-sized devices, so a proposal to relax the four receive antenna requirement to two receive antennas for such devices is being discussed.

Aspects disclosed herein provide for a UE to declare to the network that the UE in question supports two receive antennas in frequency bands that require four receive antennas. The network then uses the information from the UE to prioritize those devices using four receive antennas. The priority given by the network to the four receive antenna devices may be in effect for the entire time the UE with four receive antennas is operating on the network or the priority may be in effect only when the network is congested.

Network congestion may be measured using multiple metrics for downlink capacity and may incorporate predetermined thresholds or predetermined ranges.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of access points (i.e., access point, node, cell sites, cell towers) to provide network coverage. The access points are employed to broadcast and transmit transmissions to user devices of the telecommunications network. An access point may be considered to be a portion of an access point that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, an access point may comprise one access point or more than one access point. Factors that can affect the telecommunications transmission include, e.g., location and size of the access points, and frequency of the transmission, among other factors. The access points are employed to broadcast and transmit transmissions to user devices of the telecommunications network. Traditionally, the access point establishes uplink (or downlink) transmission with a mobile handset over a single frequency that is exclusive to that particular uplink connection (e.g., an LTE connection with an EnodeB). The access point may include one or more sectors served by individual transmitting/receiving components associated with the access point (e.g., antenna arrays controlled by an EnodeB). These transmitting/receiving components together form a multi-sector broadcast arc for communication with mobile handsets linked to the access point.

As used herein, "access point" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE). The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby access point. A UE may be, in an embodiment, similar to device 400 described herein with respect to FIG. 4.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), smart glasses or XR goggles, and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby access point or access point.

A first aspect of the present disclosure provides a method for congestion-based scheduling in a network, based on device capabilities. A method for congestion-based scheduling in a network based on device capabilities begins with receiving, from a first user device, a device capability message, wherein the device capability message comprises a number of receive antennas of the first user device for each supported frequency band. Next, the method continues with determining that the number of receive antennas of the first user device is not equal to the number of receive antennas required by the network operator for the assigned frequency band. Then, based on the determining, the method continues with prioritizing at least one downlink transmission to at least one second user device. The at least one second user device comprises the number of receive antennas required by the network operator for the assigned frequency band. Prioritization information is then transmitted to the first user device and the at least one second user device.

A second aspect of the present disclosure provide a method for congestions-based scheduling in a network. The method begins with receiving, from a first user device, a device capability message, wherein the device capability message comprises a number of receive antennas of the first user device for each supported frequency band. The method continues with determining that the number of receive antennas of the first user device is not equal to the number of receive antennas required by the network operator for the assigned frequency band. Then, based on the determining, determining that a network congestion metric exceeds a predefined threshold; Then, the method concludes with prioritizing at least one downlink transmission to a second user device, based on the network congestion metric exceeding the predefined threshold.

Another aspect of the present disclosure is directed to a non-transitory computer storage media storing computer-usable instructions that cause the processors to receive, from a first user device, a device capability message, wherein the device capability message comprises a number of receive antennas of the first user device for each supported frequency band. The instructions continue with determine that the number of receive antennas of the first user device is not equal to the number of receive antennas required by the network operator for the assigned frequency band. Then based on the determination, the instructions then direct the processors to prioritize at least one downlink transmission to the at least one second user device, wherein the at least one second user device comprises the number of receive antennas required by the network operator for the assigned frequency band. The instructions then direct the processors to transmit a prioritization information to the first user device and the at least one second user device.

Figure 1:
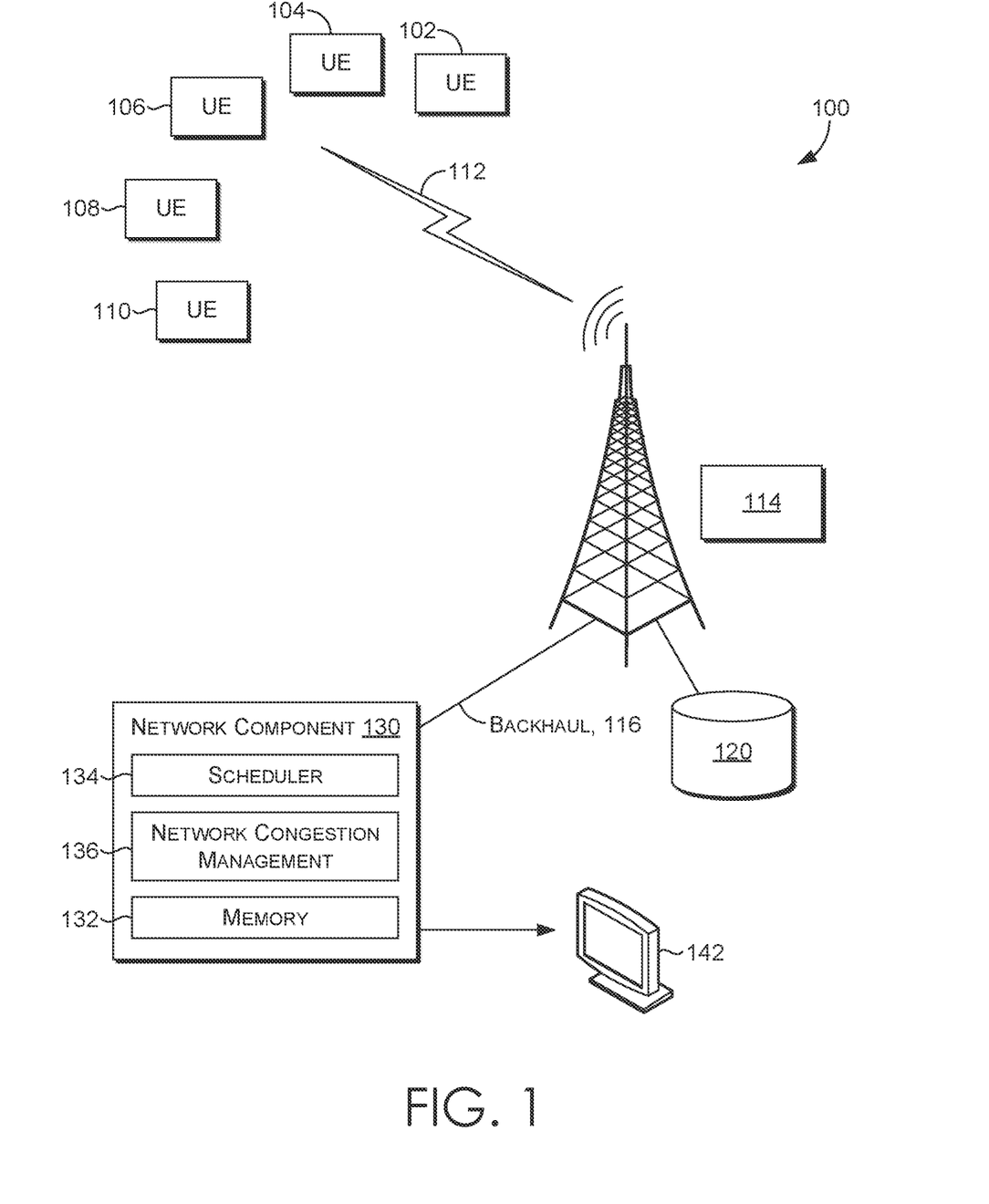
FIG. 1 depicts a diagram of an exemplary network environment in which implementations of the present disclosure may be employed, in accordance with aspects herein.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user devices (UE) 102, 104, 106, 108, and 110, access point 114 (which may be a cell site, access point, or the like), and one or more communication channels 112. The communication channels 112 can communicate over frequency bands assigned to the carrier. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 400) that communicates via wireless communications with the access point 114 in order to interact with a public or private network. A UE may also be a wearable device such as a smart watch, smart glasses, fitness tracker or similar device.

Figure 4:
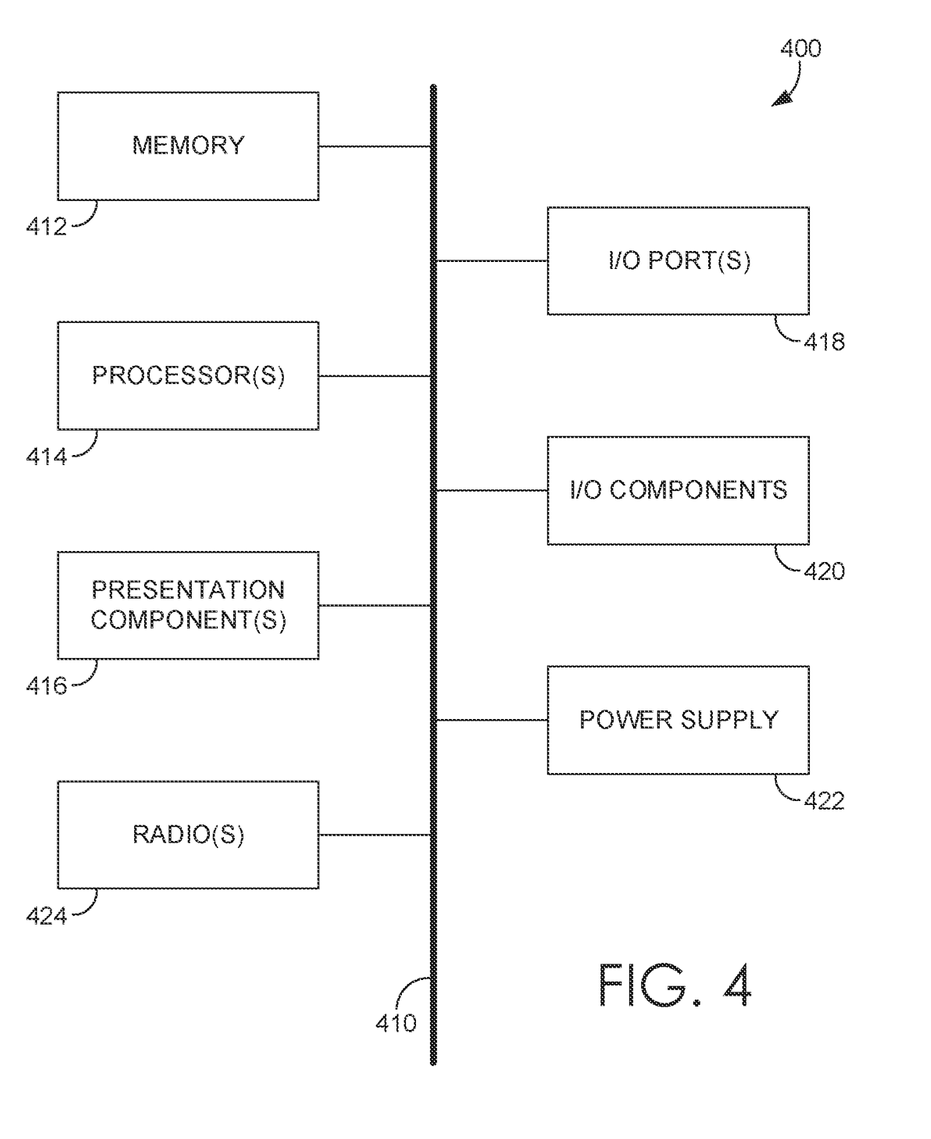
FIG. 4 depicts an exemplary computing device suitable for use in implementations of the present disclosure, in accordance with aspects herein.

In some aspects, each of the UEs 102, 104, 106, 108, and 110 may correspond to computing device 400 in FIG. 4. Thus, a UE can include, for example, a display(s), a power source(s) (e.g., a battery), a data store(s), a speaker(s), memory, a buffer(s), a radio(s) and the like. In some implementations, for example, a UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, 6G, LTE, CDMA, or any other type of network. In some cases, UEs 102, 104, 106, 108, and 110 in network environment 100 can optionally utilize one or more communication channels 112 to communicate with other computing devices (e.g., a mobile device(s), a server(s), a personal computer(s), etc.) through access point 114.

The network environment 100 may be comprised of a telecommunications network(s), or a portion thereof. A telecommunications network might include an array of devices or components (e.g., one or more access points), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure. Network environment 100 may comprise equipment placed in network operator facilities, but may also comprise equipment located at a customer's premises, known as customer premises equipment (CPE).

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network. The telecommunication network may also provide services using MU-MIMO techniques.

Figure 2:
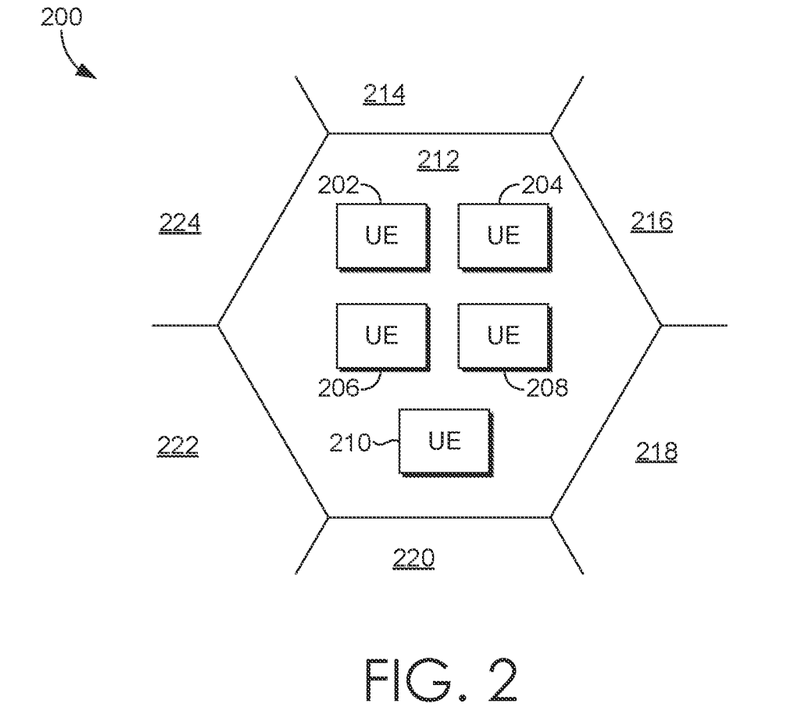
FIG. 2 depicts a cellular network suitable for use in implementations of the present disclosure, in accordance with aspects herein.

In some implementations, access point 114 is configured to communicate with a UE, such as UEs 102, 104, 106, 108, and 110, that are located within the geographic area, or cell, covered by radio antennas of access point 114. FIG. 2, below, illustrates multiple cells in a network. Access point 114 may include one or more access points, base transmitter stations, radios, antennas, antenna arrays, power amplifiers, transmitters/receivers, digital signal processors, control electronics, GPS equipment, and the like.

As shown, access point 114 is in communication with a network component 130 and at least a network database 120 via a backhaul channel 116. As the UEs 102, 104, 106, 108, and 110 collect individual signal information, the signal information can be automatically communicated by each of the UEs 102, 104, 106, 108, and 110 to the access point 114. Access point 114 may store the signal information and data communicated by the UEs 102, 104, 106, 108, and 110 at a network database 120. The signal information may comprise information on congestion metrics such as frequency band utilization, packet loss, latency, jitter, error rates, bandwidth usage by device, and similar signal metrics. Alternatively, the access point 114 may automatically retrieve the status data from the UEs 102, 104, 106, 108, and 110, and similarly store the data in the network database 120. The signal information and data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the access point 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132, a scheduler 134, and a network congestion management module 136. All determinations, calculations, and data further generated by the scheduler 134 and the network congestion management module 136 may be stored at the memory 132 and also at the network database 120. Computer terminal 142 is in communication with the network component 130 and with the memory 132, scheduler 134, and network congestion management module 136 through the network component 130. Although the network component 130 is shown as a single component comprising the memory 132, scheduler 134, and network congestion management module 136, it is also contemplated that each of the memory 132, scheduler 134, and network congestion management module 136 may reside at different locations, be its own separate entity, and the like, within the home network carrier system.

The network component 130 is configured to retrieve network congestion metrics using the network congestion management module 136 from the access point 114 or one of the UEs, 102, 104, 106, 108, and 110. Network congestions metrics can include any one or more of multiple metrics, such as frequency band utilization, packet loss, latency, jitter, error rates, and bandwidth usage by device. The network component 130 can also track uplink and downlink user traffic. The scheduler 134 can observe downlink signals on multiple frequencies over the network using measurement metrics such as SINR, reference signal received power (RSRP) and reference signal received quality (RSRQ). The scheduler 134 and network congestion management module 136 may each be located in a central office or other centralized location, but may also be mounted on an access point. The scheduler 134, acting in conjunction with the network congestion management module 136 may then ensure that the UEs 102, 104, 106, 108, and 110, receive network services in a manner that allows UEs with two receive antennas to receive downlink signals in a frequency band that would typically require the UEs to have four receive antennas.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cell sites 212, 214, 216, 218, 220, 222, 224, each including access point 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell site 212 and can move to other cells such as adjoining cell sites 214, 216, 218, 220, 222 and 224.

Embodiments disclosed herein provide methods, systems, and non-transitory computer storage media that provide congestion-based scheduling in a network, based on the device capabilities. The UEs accessing the network may be reduced capacity devices, such as smartwatches, smart glasses, or fitness tracker, or similar devices. Congestion-based scheduling based on device capabilities begins with a UE transmitting a message to an access point. In the message, the UE indicates that it supports two receive antennas and is seeking to connect using a frequency band where the network operator prefers four receive antennas. The network then uses the information transmitted by the UE to prioritize downlink transmissions to UEs with four receive antennas. The prioritization assigned by the network may continue indefinitely or may apply only when the network is congested. If the network is not congested when the UE with two receive antennas requests access, the network ignores the capability of the UE with two receive antennas. When the network is congested however, the network may limit access to downlink resources for UEs with two receive antennas.

If network congestion occurs while UEs with two receive antennas are receiving downlink transmissions, the network may reduce congestion by limiting access to downlink resources for those UEs. Network congestion may be measured using frequency band utilization. Frequency band utilization may use a predetermined usage threshold that may be defined as a percentage of the frequency band, such as 80% or some other value preselected by the network operator. Network congestion may also be determined based on packet loss, such as a predetermined percentage of dropped packets or a threshold number of dropped packets. Latency may also be used as a network congestion metric. Latency refers to the time it takes for data to travel from one point to another on the network. If the latency increases beyond a preselected threshold time, the network may be considered congested. A still further congestion metric is jitter. Jitter measures the variation in latency over time and can be measured. An increase in jitter may also indicate a congested network if the jitter increases beyond a preselected threshold time. In addition, an error rate may be used to determine if the network is congested. An increase in the error rate may also indicate congestion and a predetermined error rate threshold may be used to implement congestion-based scheduling based on UE capabilities. Bandwidth usage according to device may also be used as a congestion metric and could be implemented by tracking an amount of downlink bandwidth used by devices with two receive antennas. A network operator could also implement a congestion metric based on a number of UEs accessing network services at an access point, with a predetermined numerical threshold used to determine when congestion-based scheduling based on UE capabilities should be implemented.

A network operator may implement congestion-based scheduling based on device capabilities in multiple ways. One option is to assign UEs with two receive antennas to a specific segment of bandwidth. The specific segment of bandwidth is smaller than the bandwidth of the full channel. A second option is for the network operator to limit UEs with two receive antennas to frequency bands that do not mandate four receive antennas. A third option is for the network operator to schedule downlink data so as to prioritize allocation of downlink resources to UEs with four receive antennas, while limiting the allocation of downlink data to UEs with two receive antennas. Each of these options may be implemented at all times, or may be implemented only when network congestion is occurring.

Figure 3:
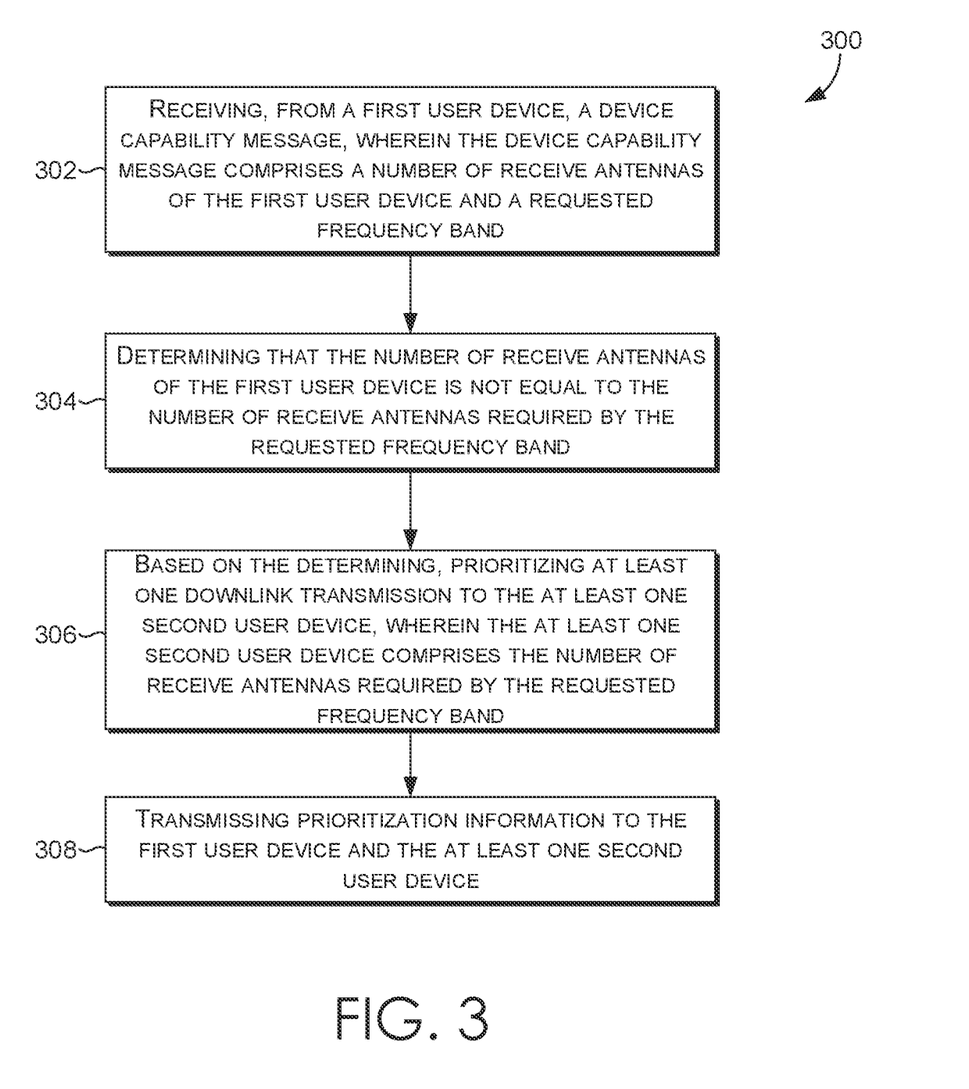
FIG. 3 depicts a flow diagram of an exemplary method for congestion-based scheduling in a network, based on device capabilities, in accordance with aspects herein.

FIG. 3 depicts a flow diagram of an exemplary method for congestion-based scheduling in a network, based on device capabilities, in accordance with aspects herein. The method 300 begins in step 302 with receiving, from a first user device, a device capability message, the device capability message comprising a number of receive antennas of the first user device for each supported frequency band. The method continues in step 304 with determining that the number of receive antennas of the first user device are not the number of receive antennas required by the network operator for the assigned frequency band. Then, in step 306, the method continues with based on the determining, prioritizing at least one downlink transmission to the at least one second user device, wherein the at least one second user device comprises the number of receive antennas required by the network operator for the assigned frequency band. The method concludes in step 308 with transmitting prioritization information to the first user device and the at least one second user device.

The method may also provide for the prioritization to assign the first priority to the at least one second user device. The first priority is higher than a second priority which is assigned to the first user device. The first user device comprises two receive antennas while the at least one second user device comprises four receive antennas. The assigned frequency band can require four receive antennas. Prioritization may occur when the network is congested and may continue indefinitely. Alternatively, prioritization may continue while the network is congested, based on a congestion metric, and may be discontinued once the network congestion has cleared.

A number of network metrics may be used to determine network congestion. Network congestion may be defined as present when utilization of the assigned frequency band exceeds a predefined percentage of the frequency band. Network congestion may also be determined using packet loss rates that exceed a threshold rate, error rates increasing or exceeding a predetermined threshold, and an increase in latency.

FIG. 4 depicts an exemplary computing device suitable for use in implementations of the present disclosure, in accordance with aspects herein. With continued reference to FIG. 4, computing device 400 includes bus 410 that directly or indirectly couples the following devices: memory 412, one or more processors 414, one or more presentation components 416, input/output (I/O) ports 418, I/O components 420, radio(s) 424, and power supply 422. Bus 410 represents what may be one or more busses (such as an address bus, data bus, or combination thereof). Although the devices of FIG. 4 are shown with lines for the sake of clarity, in reality, delineating various components is not so clear, and metaphorically, the lines would more accurately be grey and fuzzy. For example, one may consider a presentation component such as a display device to be one of I/O components 420. Also, processors, such as one or more processors 414, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 4 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer-storage media in the form of volatile and/or nonvolatile memory. Memory 412 may be removable, nonremovable, or a combination thereof. Exemplary memory includes solid-state memory, hard drives, optical-disc drives, etc. Computing device 400 includes one or more processors 606 that read data from various entities such as bus 410, memory 412 or I/O components 420. One or more presentation components 416 present data indications to a person or other device. Exemplary one or more presentation components 416 include a display device, speaker, printing component, vibrating component, etc. I/O ports 418 allow computing device 400 to be logically coupled to other devices including I/O components 420, some of which may be built into computing device 400. Illustrative I/O components 420 include a microphone, joystick, game pad, satellite dish, scanner, printer, wireless device, etc.

The radio(s) 424 represents one or more radios that facilitate communication with a wireless telecommunications network. While a single radio 424 is shown in FIG. 4, it is contemplated that there may be more than one radio 424 coupled to the bus 410. Illustrative wireless telecommunications technologies include CDMA, GPRS, TDMA, GSM, and the like. The radio 424 may additionally or alternatively facilitate other types of wireless communications including Wi-Fi, WiMAX, LTE, 3G, 4G, LTE, 5G, NR, VOLTE, or other VOIP communications. As can be appreciated, in various embodiments, radio 424 can be configured to support multiple technologies and/or multiple radios can be utilized to support multiple technologies. A wireless telecommunications network might include an array of devices, which are not shown so as to not obscure more relevant aspects of the invention. Components such as a access point, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for congestion-based scheduling in a network, based on device capabilities, the method comprising:
receiving, from a first user device, a device capability message, wherein the device capability message comprises a number of receive antennas of the first user device for each supported frequency band;
determining that the number of receive antennas of the first user device is not equal to the number of receive antennas required by a network operator for an assigned frequency band;
based on the determining, prioritizing at least one downlink transmission to at least one second user device, wherein the at least one second user device comprises the number of receive antennas required by the network operator for the assigned frequency band; and
transmitting prioritization information to the first user device and the at least one second user device.

2. The method of claim 1, wherein prioritizing at least one downlink transmission to the at least one second user device assigns a first priority to the at least one second user device.

3. The method of claim 2, wherein prioritizing at least one downlink transmission to the at least one second user device assigns a second priority to the first user device.

4. The method of claim 3, wherein the second priority is lower than the first priority.

5. The method of claim 1, wherein the first user device has two receive antennas.

6. The method of claim 1, wherein the second user device has four receive antennas.

7. The method of claim 1, further comprising determining that the network is congested before prioritizing the at least one downlink transmission.

8. The method of claim 7, wherein prioritizing the at least one downlink transmission continues indefinitely.

9. The method of claim 7, wherein prioritizing the at least one downlink transmission continues for a duration of the network congestion.

10. The method of claim 7, wherein determining that the network is congested uses at least one of: frequency band utilization, packet loss, error rate, and latency.

11. The method of claim 10, wherein the frequency band utilization uses a predefined percentage of the frequency band as a congestion threshold.

12. A method for providing congestion-based scheduling in a network, the method, comprising:
receiving, from a first user device, a device capability message, wherein the device capability message comprises a number of receive antennas of the first user device for each supported frequency band;
determining that the number of receive antennas of the first user device is not equal to the number of receive antennas required by the network operator for an assigned frequency band;
based on the determining, determining that a network congestion metric exceeds a predefined threshold; and
prioritizing at least one downlink transmission to a second user device, based on the network congestion metric exceeding the predefined threshold.

13. The method of claim 12, wherein the network congestion metric is a predefined percentage of a frequency band utilization of the assigned frequency band.

14. The method of claim 12, wherein the predefined percentage is at least 80 percent of the assigned frequency band.

15. The method of claim 12, wherein the prioritizing the at least one downlink transmission to the second user device continues for a duration of the network congestion.

16. A non-transitory computer storage media storing computer-usable instructions that, when used by one or more processors, cause the processor to:
receive, from a first user device, a device capability message, wherein the device capability message comprises a number of receive antennas of the first user device for each supported frequency band;
determine that the number of receive antennas of the first user device is not equal to the number of receive antennas required by a network operator for an assigned frequency band;
based on the determination, prioritize at least one downlink transmission to at least one second user device, wherein the second user device comprises the number of receive antennas required by the network operator for the assigned frequency band; and
transmit prioritization information to the first user device and the at least one second user device.

17. The non-transitory computer storage media of claim 16, wherein prioritize at least one downlink transmission to the at least one second user device assigns a first priority to the at least one second user device.

18. The non-transitory computer storage media of claim 17, wherein prioritize at least one downlink transmission to the at least one second user device assigns a second priority to the first user device.

19. The non-transitory computer storage media of claim 18, wherein the second priority is lower than the first priority.

20. The non-transitory computer storage media of claim 16, wherein the first user device has two receive antennas and the second user device has four receive antennas.

* * * * *